US011072024B1

(12) United States Patent
Ives et al.

(10) Patent No.: US 11,072,024 B1
(45) Date of Patent: Jul. 27, 2021

(54) 3D PRINTED ELECTRON BEAM DEVICE

(71) Applicant: Calabazas Creek Research, San Mateo, CA (US)

(72) Inventors: R. Lawrence Ives, San Mateo, CA (US); David B. Marsden, Fremont, CA (US); Timothy Joseph Horn, Raleigh, NC (US); Christopher Dewayne Rock, Raleigh, NC (US); John Christopher Ledford, Raleigh, NC (US)

(73) Assignee: Calabazas Creek Research, Inc., San Mateo, CA (US)

( * ) Notice: Subject to any disclaimer, the term of this patent is extended or adjusted under 35 U.S.C. 154(b) by 79 days.

(21) Appl. No.: 16/411,139

(22) Filed: May 14, 2019

(51) Int. Cl.
*B22F 10/00* (2021.01)
*B33Y 80/00* (2015.01)
*B33Y 10/00* (2015.01)

(52) U.S. Cl.
CPC .......... *B22F 10/00* (2021.01); *B22F 2301/10* (2013.01); *B22F 2304/10* (2013.01); *B33Y 10/00* (2014.12); *B33Y 80/00* (2014.12)

(58) Field of Classification Search
CPC B22F 3/1055; B22F 2304/10; B22F 2301/10; B22F 2003/1059; B33Y 80/00; B33Y 10/00
See application file for complete search history.

(56) References Cited

U.S. PATENT DOCUMENTS 9,013,104 B1 * 4/2015 Ferguson ............ H01J 23/0873
315/5.35

* cited by examiner

*Primary Examiner* — Anthony J Zimmer
*Assistant Examiner* — Jacob James Gusewelle
(74) *Attorney, Agent, or Firm* — File-EE-Patents.com; Jay A. Chesavage

(57) ABSTRACT

An RF circuit for an electron beam device is formed with successive layers of fusible metal particles applied in layers and translated with respect to an electron beam. Segments of an electron device may be formed which include an open RF cavity at each end of the segment, which can be machined before the segments are brazed together. In one example, the electron beam device may have iron pole pieces assembled into the partially fused device to provide a magnetic circuit and support for subsequent layers of fused particles. The inner surfaces of the RF circuit structure may be smoothed using an etching or machining operation, and the segments may be brazed together to form a completed RF circuit structure with the magnetic pole pieces included in the monolithic structure segments.

27 Claims, 8 Drawing Sheets

Cross Section View of Klystron RF circuit

Figure 3A
Cross Section View of Klystron RF/Cooling circuit

Figure 3B
Section A-A

Figure 3C
Section B-B

Figure 4A
Cross Section View of Klystron RF circuit

Figure 4B
Section A-A

Figure 4C
Section B-B

Figure 5A
Canonical Single-Step Segment of Klystron

Figure 5B
Integrated Polepiece Klystron Segment – A

Figure 5C
Integrated Polepiece Klystron Segment – B

Figure 5D
Integrated Polepiece Klystron Segment – C

Figure 5E
Integrated Polepiece Klystron Segment – D

Figure 5F
Integrated Polepiece Klystron Segment – E

*Figure 7A*
Pole Piece Section A-A

*Figure 7B*
Coolant Cavity Section B-B

*Figure 7C*
RF Cavity C-C

3D PRINTED ELECTRON BEAM DEVICE

FIELD OF THE INVENTION

The present invention relates to 3D printing of the RF circuit for an electron tube. In particular, the present invention relates to forming the RF circuit of an electron tube by applying successive layers of metal powder onto a substrate and fusing the metal powder into monolithic patterns using an electron beam with sufficient energy to fuse a current layer of metal powder to previously formed underlying layers.

BACKGROUND OF THE INVENTION

A Klystron is a linear electron beam amplifier tube which includes an RF circuit for introducing and removing RF which velocity modulates an electron beam travelling in a beam tunnel. The RF circuit is typically assembled from different subassemblies formed from heterogenous materials, and made into an assembly which includes an electron beam tunnel having alternating drift tubes, RF cavities defined by gaps in the drift tubes, magnetic field generators, and cooling structures. The structure of these devices is presently limited to those which can be formed using subtractive machining processes performed using solid blocks of copper and machine tools for removal of unwanted material, with pole pieces installed over the beam tunnel as two half disks.

Three Dimensional (3D) printing of plastics has become commonplace with the advent of thermoplastics applied on an x-y table using an additive process of applying layers of heated thermoplastic liquid which hardens after application and cooling.

3D printing of metals remains a challenging process. The metal particles are typically delivered as a powder and the powder may be fused into a monolith using an intense laser beam or electron beam.

It is desired to provide an electron beam device such as a klystron in a form which can be 3D printed, machined, and brazed into a single integral device.

It is desired to provide a linear electron beam device which can be printed using metal powder in a series of fused layers of metal powder.

OBJECTS OF THE INVENTION

A first object of the invention is an electron beam device formed from an iteration of steps, each step comprising:
placing a thin layer of metal particles onto a substrate;
heating the metal particles in regions with an energized beam such as an electron beam until the metal particles fuse together along the path of the energized beam;
smoothing the inner or outer surfaces of the resultant electron beam device using a mechanical or abrasive means;
thereby forming segments of an entire electron beam device RF circuit having an electron beam tunnel, RF cavities, and cooling chambers.

A second object of the invention is an RF circuit for an electron tube device, the RF circuit having at least one electron beam tunnel, the at least one electron beam tunnel surrounded by a monolithic pole piece formed of a single piece of ferromagnetic material such as iron, the electron beam tunnel having drift tube segments and Radio Frequency (RF) cavity segments, at least one of the RF cavities or drift tube segments thermally coupled to a cooling chamber for circulating a coolant.

SUMMARY OF THE INVENTION

An RF circuit for an electron tube device is formed by iteratively placing a thin layer of metal particles onto an underlying layer, directing a focused high energy electron beam at the thin layer of metal particles along a path, the electron beam energy being high enough to fuse a patterned path of metal particles of a current layer into an underlying layer, at least some of the path delineating an inner shell, outer shell, beam tunnel, RF cavity, or cooling surface of an electron tube device. An inner or outer part of the shell surface is optionally smoothed in a subsequent smoothing step. In one example, the iteration of applying a thin layer of metal particles and fusing the metal particles along a path onto an underlying layer is done such that two halves of an electron device are formed, the two halves having inner surfaces which are smoothed and joined together such as by a brazing operation, thereby forming a monolithic electron device having resonant cavities (RF cavities) and drift tubes. In another example of the invention, the fusing electron beam is substantially parallel to the electron beam tunnel of the device being fabricated and the segments are brazed in an axial extent. In another example of the invention, the fusing electron beam is swept over a pattern path using electrostatic deflection, and in another example of the invention, the electron beam is moved with respect to a substrate. In another example of the invention, a magnetic circuit is incorporated into the RF circuit, such as by placement of discrete pole pieces as single units into the RF circuit during the additive machining process, followed by the subsequent addition of magnetic field generators such as permanent magnets. In another example of the invention, a klystron is formed in segments and the segments are brazed together. Each segment has, in sequence, a part of an RF cavity, a pole piece gap, optionally a cooling cavity and pole piece gap, and part of an RF cavity, where the RF cavities include features which allow adjacent segments to be brazed together and the pole piece gap provides for the installation of pole pieces, thereby forming a klystron.

In another example of the invention, a klystron is formed by patterned fusing of particles of metal powder to form the RF circuit for a linear beam device, the RF circuit having at least one beam tunnel, each of the at least one beam tunnels passing through an aperture in an iron pole having corresponding apertures for the beam tunnels, the iron pole piece installed between fusing steps, each of the electron beam tunnels passing through the apertures of a common pole piece and coupled to a common RF cavity, each beam tunnel having separate drift tube segments between RF cavities.

DETAILED DESCRIPTION OF THE INVENTION

Figure 1:
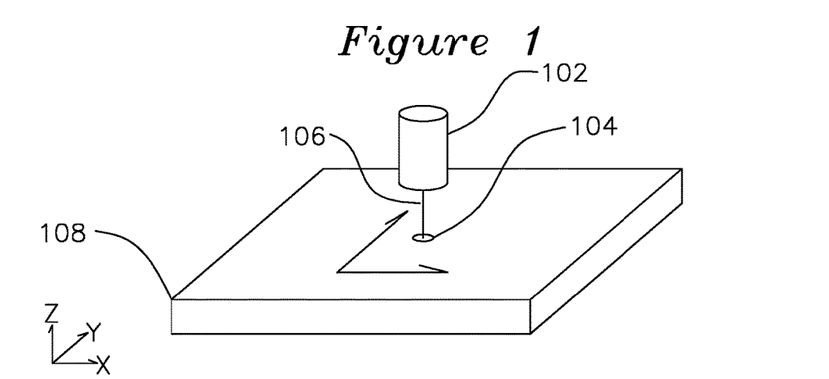
FIG. 1 shows a perspective view of an x-y e-beam table operative to fuse a layer of metal particles placed on a substrate.

FIG. 1 shows an energy source 102 such as a laser or electron beam (e-beam) source operated in an evacuated chamber (not shown). The energy source 102 generates an electron beam which is operative to be deflected onto a substrate 108 in the XY plane, such that in one aspect of the invention, the energy source 102 or the substrate 108 is operative to move about an X-Y coordinate system as shown, or in another aspect of the invention, the substrate 108 and electron beam source 102 are stationary or moving with respect to each other, and in another aspect of the invention, electrostatic deflection of the electron beam 106 is used to fuse the metal powder in a succession of applied and patterned layers, or any of these methods for directing the electron beam to a pattern may be used individually or in combination. In one example of the invention for forming electron tube devices, an electron beam (e-beam) 106 imparts sufficient thermal energy onto a thin layer of metal powder placed on substrate 108 to fuse the metal particles to each other in the patterned area and also to an underlying layer of fused metal particles. The particle fusing characteristic using an e-beam is governed by the e-beam current, e-beam writing speed, size of the beam spot 104, distance between melt lines, and any parameters which modulate the e-beam speed or current during the pattern write process to maintain a constant heat load for each layer. Prior to the pattern write process which fuses the particles, a preheat temperature may be applied which maintains the metal particles at a sintering temperature. This may be assisted with an elevated substrate plate temperature or by scanning the e-beam over the surface of particles. During the e-beam write process, the chamber is evacuated to on the order of $5 \times 10^{-5}$ mbar. Optionally, a non-reactive gas such as helium, argon, hydrogen, could be used, for example where a laser source is used as the patterned heat generator for fusing metal particles.

By forming a series of unique underlying layers and modulating the path of the e-beam for each layer such that each subsequent path is bonded by particle fusion to an underlying layer, arbitrary shapes may be formed by the iteration of application of powder and patterned fusing of each layer to regions of a fused and unfused layer below. In one example of the invention for illustration purposes, the RF cavity is formed as two half sections, one of which is shown in the series of FIGS. 2A to 2F. The RF circuit may be formed of many different metals. In the present example, copper particles are fused to form a monolithic copper RF structure. Suitable ranges for copper particles are on the order of 10 um, or on the order of 100 um or smaller. The copper particles must also be free of oxides, and the electron beam fusing performed in a high vacuum environment, both to enable the electron beam to propagate, as well as to avoid oxidation of the surface of the copper particles, which may otherwise appear at the fused particle boundaries and increase the porosity of the consolidated monolithic structure and interfere with the vacuum holding properties of the finished klystron or electron device.

Example copper powders are available from Arcam AB, Sweden. For copper, an electron beam is required to couple sufficient energy into the copper particles to fuse them together, whereas for other metals, energy source 102 can be a laser with energy beam 106 being an optical beam selected for fusing properties of the target layer of metal particles. In the present example, copper particles are fused using an electron beam.

Figure 2A:
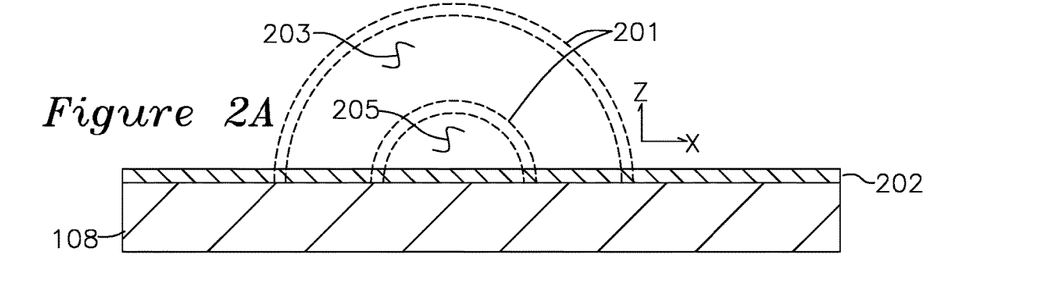
FIG. 2A shows a section view of a substrate.
Figure 2B:
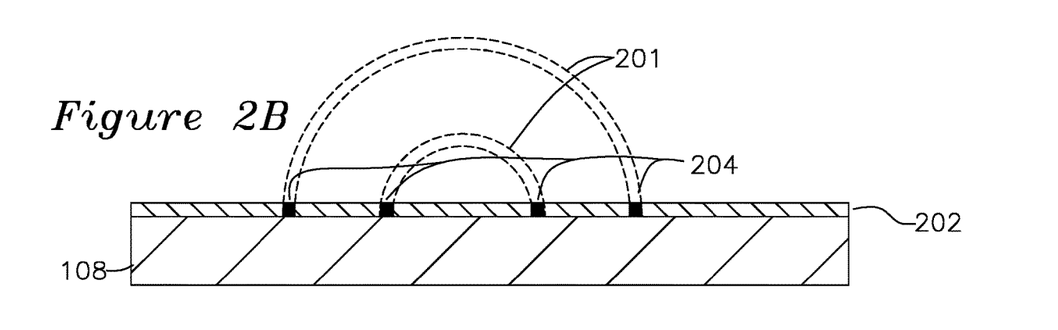
FIG. 2B shows a section view of a substrate after fusing a first layer of metal particles.

FIG. 2A shows a section view of a substrate 108 which has a layer of metal powder 202 applied to the surface facing the e-beam 106 of FIG. 1. The e-beam 106 is applied for a duration of time sufficient to fuse the metal powder 202. Preferably, the e-beam is steered in the X and Y axes using electrostatic deflection, which provides the ability to maintain the powder at an elevated temperature prior to fusing. Each fused powder layer forms a patterned layer of the desired structure, shown as dashed line 201 forming an outline path of a desired example outer cooling jacket 203 and inner beam tunnel 205. The fused layers form a monolith which is sufficiently densified and without gaps or voids so as to be able to maintain an internal vacuum when the process is completed and the fabricated device is operated as a linear electron beam device such as a klystron, magnetron, cross field amplifier, inductive output tube, or other devices known in the microwave and millimeter wave industries. The completion of the first layer e-beam patterned metal fusion step is shown FIG. 2B as 204, surrounded by native metal powder 202 which has not been subjected to the patterned e-beam heating.

Figure 2C:
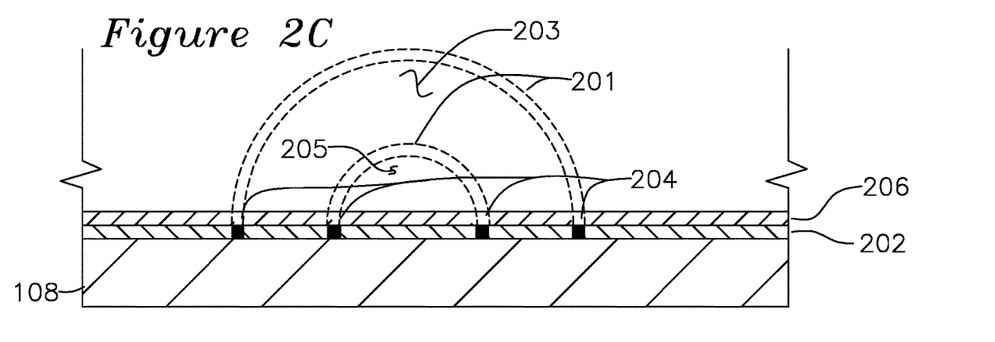
FIGS. 2C, 2D, 2E, and 2F show successive steps of metal powder application and fusing operations.
Figure 2D:
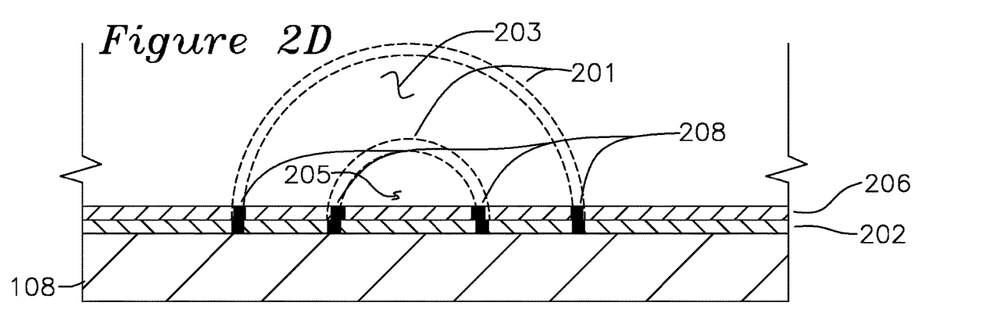

FIG. 2C shows the application of a new metal powder layer 206 above the first layer 202 with fused regions 204. FIG. 2D shows the metal powder after writing the e-beam pattern and fusing selected regions 208 of new layer 206 onto the previously fused patterned regions of layer 202, thereby binding the selected pattern regions of new layer 206 to the patterned region of the layer below it. Region 203 may be used for water jacket cooling.

Figure 2E:
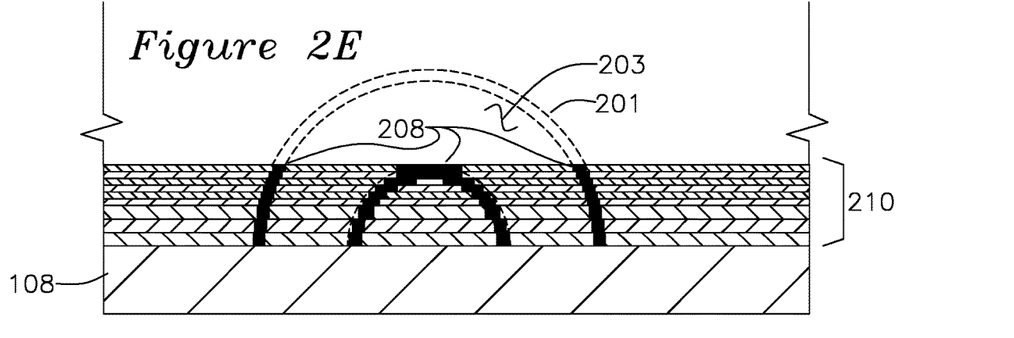

FIG. 2E shows a progression of patterned layers 210, each layer patterned such that the fused region corresponds to the desired shape 201 (shown in FIG. 2D). The layers of applied/fused metal powder can optionally all be the same thickness (such as layers 202 and 206), or they can be varied in thickness to provide increased resolution of the structure, as can be seen in the step pattern of FIG. 2E with thinner layers of particles above thicker lower layers of particles to be fused. The advantage of this technique is to reduce the finished step size in regions where the slope of the formed surface is closer to 0 (more horizontal), with the layer thickness reduced for pattern features which form a shape of increasing surface slope and thicker particle layers where the slope is vertical in Z (infinite slope). The benefit of changing thickness as a function of surface slope may be seen in examination of the surface finish of FIG. 2G.

Figure 2F:
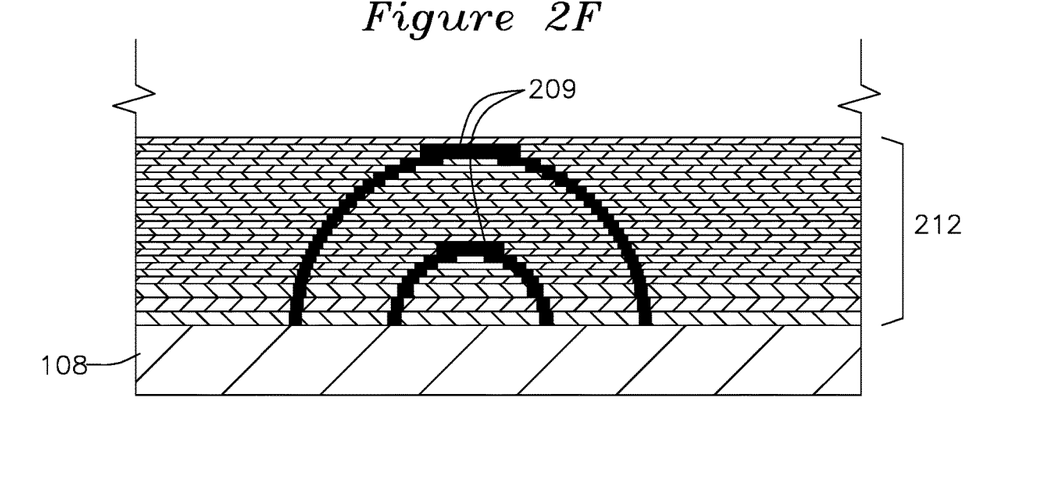
Figure 2G:
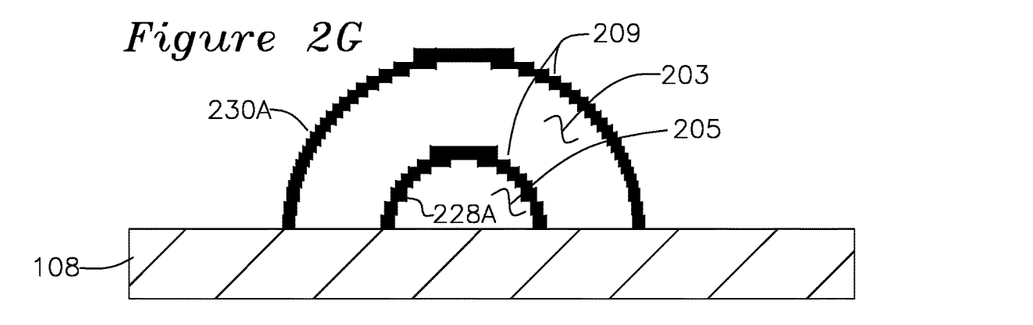
FIG. 2G shows an electron device after removal of unfused metal particles

FIG. 2F shows the completion of an example enclosure 209 formed of fused metal particles and surrounded by native unfused metal particles over the many layers 212 which were used to form the desired 3D object. At the completion of the process, the native unpatterned (unfused) metal particles may be removed and re-used in a subsequent part process after filtering or other operations to remove contaminates resulting from the e-beam fusing operation. FIG. 2G shows the resulting form after removal of the native unfused metal particles. The enclosure 209 are integrally connected in a different extent of the device not shown. The RF structure half shape can then be removed from the substrate and rough surface 230A and rough surface 228A smoothed, as shown in FIG. 2H for smoothed inside surface 228B, smoothed outside surface 230B, and mating surfaces 220, 222, 224, and 226, for later brazing to a mirrored half of similar shape.

For the present example RF circuit of a klystron, the RF circuit consists of a central axis which has a series of co-axial cylindrical segments with small diameter known as a drift tube which has a somewhat greater diameter than the extent of a central electron beam travelling along the central axis 234, the drift tubes interleaved with a series of gaps formed as cylindrical segments with a greater diameter than the drift tube segments which serve as resonant RF cavities for coupling RF carried in the RF beam for amplification. The RF cavities have physical characteristics which are tuned to the carried RF in the electron beam. For high performance, the cavity Q-factor is adjusted to control interaction between the cavity electric fields and the electron beam. Typical techniques in the prior art for adjusting the Q-factor involve the application of RF absorbing material such as Kanthal®, conductive oxides, and the like. For roughness on the order of the operating wavelength of the electron device (the carried wavelength), a smooth inner surface is less lossy than a rough surface, and therefore the smooth inner surface has a higher Q-factor and lower fractional bandwidth (expressed as the ratio of the bandwidth of the device about a center frequency divided by the center frequency). In the present device and construction, there is an opportunity from the inherent particle fusing process and size of metal particles being fused to provide a smoothed inner surface 228B for regions which are used as beam tunnels (having a small diameter) about central axis 234, and a an inner surface in other areas which has a more roughened inner surface for the RF chambers (with greater inner diameter) about central axis 234. This may be done, for example, by varying the particle size or fusing time on a layer-by-layer basis, placing the coarser particles in layers where such roughened structure is desired (such as a low Q-factor RF cavity), and smaller particles in layers where fine structure is desired (such as a beam tunnel or RF cavity in the case of a high Q-factor). Alternatively, the intervening gap 203 may form a cooling chamber circulating a liquid, with various connecting structures (not shown) between the annular shells. By forming the structure of FIG. 2H as a mirrored upper (as shown) and lower (not shown) half, surfacing to form a smooth inner surface 228B for the drift tube or RF cavity segments, then surfacing the mating surfaces 220, 222, 224, and 226 as well as those of the matching other half, applying a thin braze material and heating the materials until the brazing material flows and seals the mating surfaces, a klystron can be made with reduced machining requirements and with arbitrarily complex inner cooling chamber 203 coolant passages, which may contain parallel tubular cooling passages, cooling passages which are helical with respect to the central axis 234, and any arbitrary cooling shapes which cannot be formed in the prior method of forming each shell of the klystron in a separate step and then joined together. Additionally, since the process of forming the klystron is a series of layers with each layer fused to the adjacent layer, the resulting klystron RF circuit half of FIG. 2H is an integral structure, so there are only two arbitrarily complex homogeneous structures to join to form the RF circuit. In an alternative embodiment of the invention, the structure may be formed as a single monolithic structure, with the central axis and beam tunnel of the klystron symmetric about the Z axis.

Figure 3A:
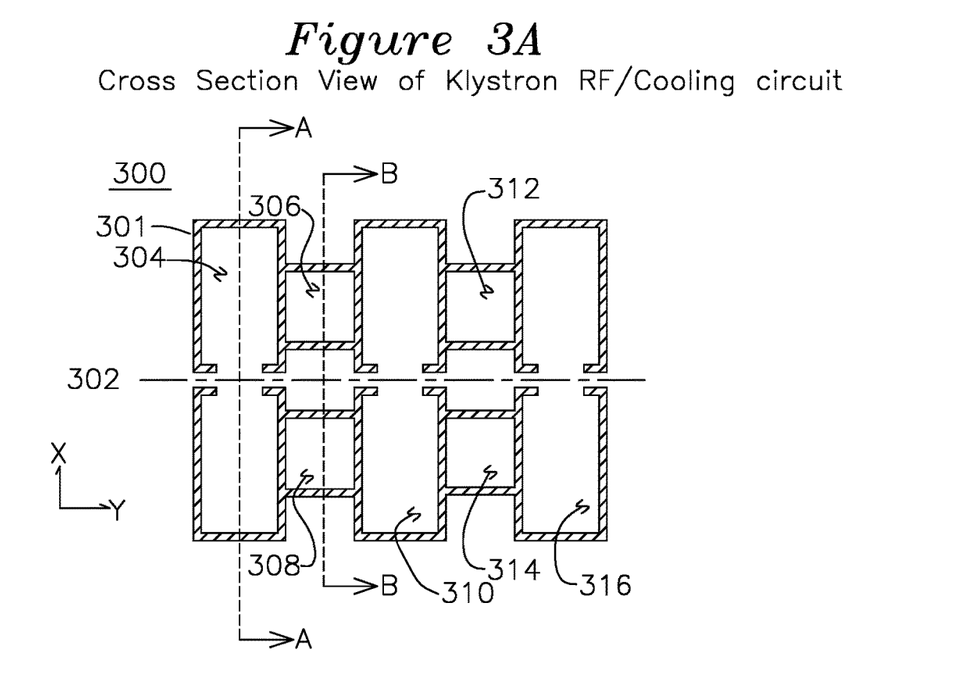
FIGS. 3A, 3B, and 3C show section views of an example klystron RF circuit formed using an example of the process.

FIG. 3A shows a circularly symmetric section view of a klystron RF circuit 301, having beam axis 302, RF cavities 304, 310, and 316. RF cavity 304 may be used for introducing RF to RF cavity 304 and RF cavity 316 used for RF removal where an axial 302 electron beam propagates in the Y direction. Optional water cooling cavities 306, 308, 312, and 314 may carry a coolant such as water through a series of channels (not shown) which are isolated from the RF cavities 304, 310, and 316. One advantage of the present fabrication process is that the layer by layer application/patterned fusing of the RF circuit structure along the Z axis allows forming cooling jackets of arbitrary form and shape integrated with and in close proximity to the RF chambers where RF losses and thermal generation tend to occur. The magnetic circuit is not shown in FIG. 3A, and may be a combination of iron pole pieces and electromagnetic field generators, or permanent magnets (added after any subsequent high temperature operations are completed) placed between the pole pieces. Pole pieces (not shown) may be added during or after fabrication of the RF circuit to form the magnetic circuit. Permanent magnet field generators may be added in a secondary operation after any high temperature operations such as device bakeout are completed to avoid subjecting the magnetic material to Curie temperatures which would cause loss of magnetization.

Figure 2H:
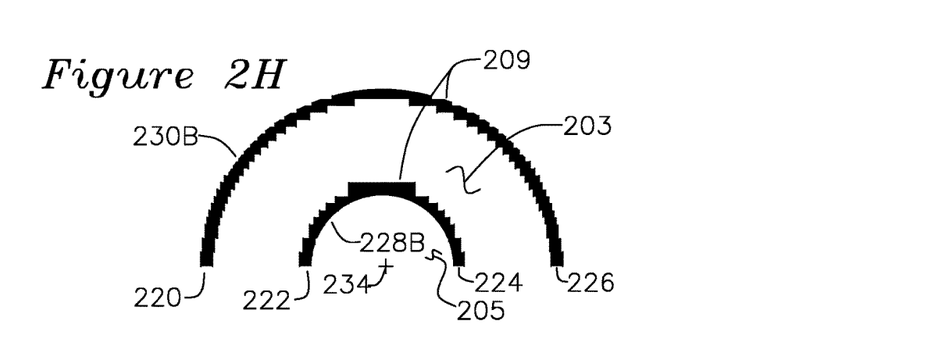
FIG. 2H shows inner surfaces of the device of FIG. 2G after an inner surface smoothing operation.
Figure 3B:
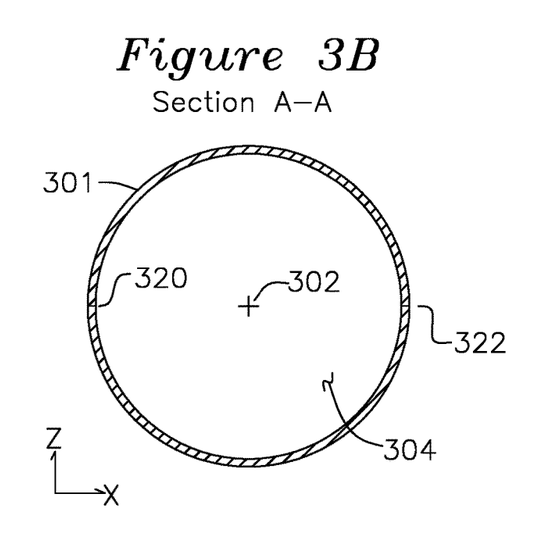
Figure 3C:
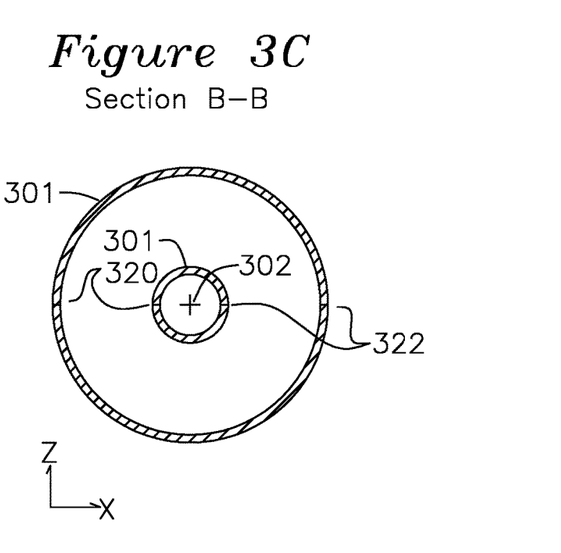

In one example of the invention, the RF circuit may be formed in layers as halves in the X-Y plane, for a device having a beam tunnel in the X or Y axis, as was shown in FIG. 2H, with the two separate halves having a braze joint 320 and 322 as shown in FIGS. 3B and 3C for cross section views A-A and B-B of FIG. 3A, respectively, with regard to the previously identified structures.

Figure 4A:
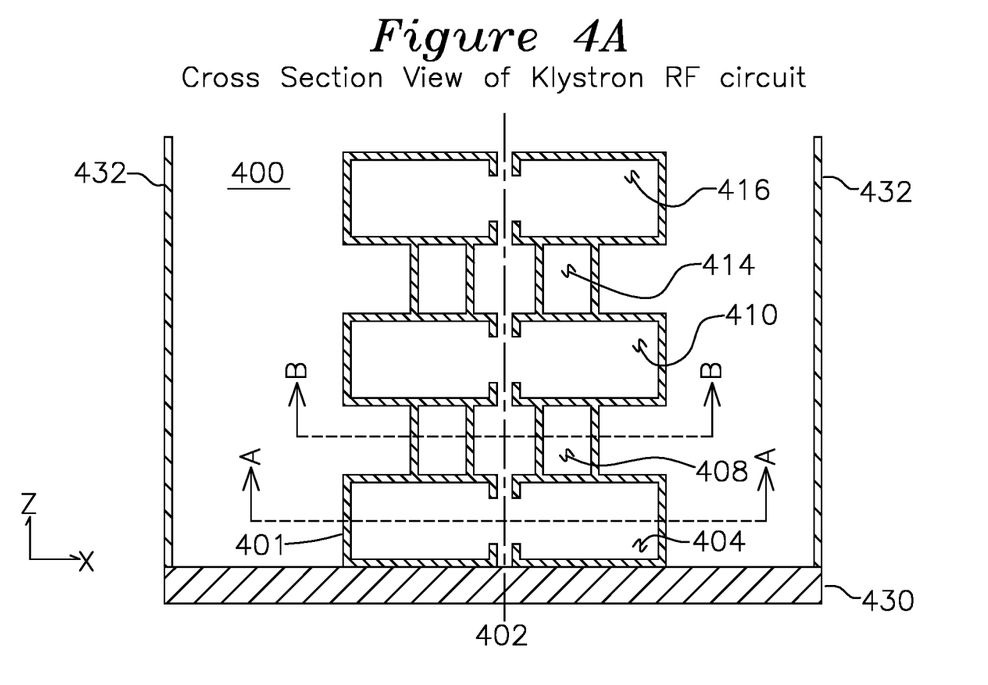
FIG. 4A shows a section view of an example klystron formed about a central axis perpendicular to a substrate.

FIG. 4A shows an alternative example of forming the klystron where the device is formed in fused layers perpendicular to the z axis with the beam tunnel parallel to the Z axis. FIG. 4A is a section view of the same klystron 400 as in FIG. 3A 300, but where device 400 has an electron beam tunnel formed in the Z axis, the klystron 400 formed as a single monolithic structure 401 on substrate 430 using a succession of fused metal particles in layers, as before. Each layer is applied as metal powder, fused or melted using a concentrated high energy source such as an electron beam source following a pattern path directed to a particular newly applied metal powder layer. The iterative process steps comprise application of a layer of metal powder followed by fusion/melting of the powder in a pattern on the X-Y plane of the most recently applied metal powder to form each respective integral layer of the klystron. Substrate 430 walls 432 have sufficient height to contain the highest layer of powder needed to contain the form of the klystron, and substrate 430 may be lowered in the z axis with each subsequent layer to maintain the spacing from electron beam source to the particular metal powder layer being fused by a focused e-beam. In this example embodiment, the method uses the circular symmetry about central axis 402 to form the klystron as a single monolithic structure. For the klystron 400, each of the features of the klystron of FIG. 3A may be formed, including RF cavities 404, 410, and 416, cooling chambers 408 and 414. The unconsolidated metal powder may be initially shaken or blown out with air, followed by a liquid surfactant to wash any remaining metal particles out of the inner chambers. Additional structure may also be added for support of magnetic field generators.

Figure 4B:
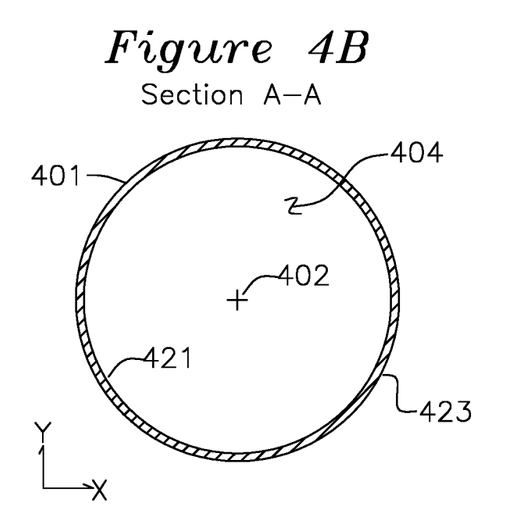
FIGS. 4B and 4C show cross section views of FIG. 4A.
Figure 4C:
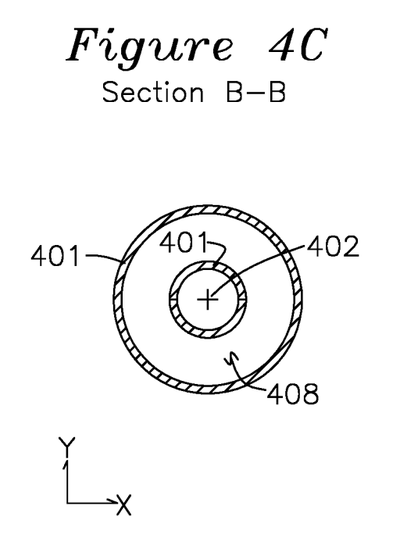

FIGS. 4B and 4C show section views of the klystron 400 through section A-A and B-B, respectively, of FIG. 4A. As before, the inner surface 421 of the RF cavity 404 or outer surfaces 423 of the klystron may be polished or machined after the application of one or more layers of fused metal to maintain a desired inner surface finish or outer surface finish. FIG. 4C shows section B-B of FIG. 4A for cooling chamber 408, and the beam tunnel inner surface about axis 402, or the outer surfaces 423 or inner surfaces 421 may be polished or machined after each iterative or group of iterative metal powder fusion process steps for the desired surface finish.

Figure 5A:
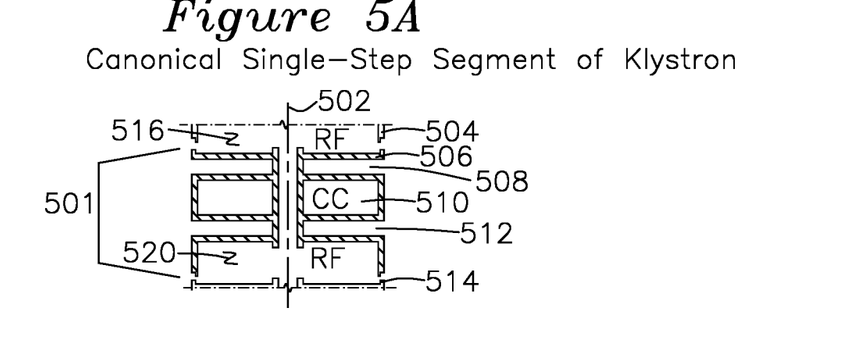
FIG. 5A shows a cross section view of a klystron segment for use in forming a klystron assembly.

One difficulty of the monolithic fabrication of FIG. 4A is the difficulty of gaining access to polish or machine the inner surfaces of the RF cavities 404, 410, and 416. FIG. 5A shows a canonical structure segment which can be formed using the additive machining process and the resultant segments brazed to each other to form a klystron subassembly. Each segment 501 includes, from top to bottom of FIG. 5A, an inner surface of an adjacent RF cavity lid 506, a pole piece gap 508, a cooling channel 510, a pole piece gap 512, and an RF cavity segment 520. Each RF cavity segment is formed into a complete enclosed RF cavity when an adjacent structure 504 or 514 is brazed to segment 501. The advantage of the klystron segment 501 construction is that the inner surfaces of the RF cavities 516 and 520 are exposed for machining. The central axis 502 may be parallel to the Z axis of FIG. 1, forming the central beam tunnel. Cooling cavity 510 typically includes ports (not shown) for circulation of a coolant such as water, and the pole piece gaps 508 and 512 are provided for the later addition pole piece pairs in each gap. Alternatively, pole pieces may be installed in gaps 508 and 512 as single monolithic disks with a central aperture, rather than as halves after construction, as has been required by the prior art. RF cavities 516 and 520 include a fixturing surface and outer diameter registration grooves for self-fixturing and subsequent brazing to adjacent segments 504 and 514.

An additional consideration of klystron construction is that the iron pole pieces which are applied between the RF cavities are installed as halves about a central aperture which surrounds the beam tunnel. It is generally desirable for magnetic field uniformity that the pole pieces be an integral disk with a central aperture rather than separate halves, such that the monolithic structure surrounds the beam tunnel and RF circuit. FIGS. 5B, 5C, 5D, 5E and 5F show an alternate construction for a klystron segment which provides for the installation of an integral single pole piece during additive machining.

Figure 5B:
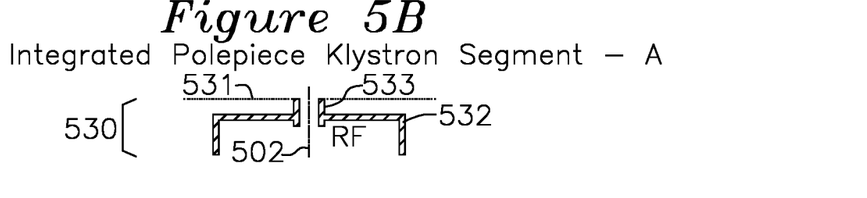
FIGS. 5B, 5C, 5D, 5E, and 5F show cross section views of the sequence of steps for forming a klystron segment similar to FIG. 5A but using pole pieces integrated into the 3D printing process.
Figure 5C:
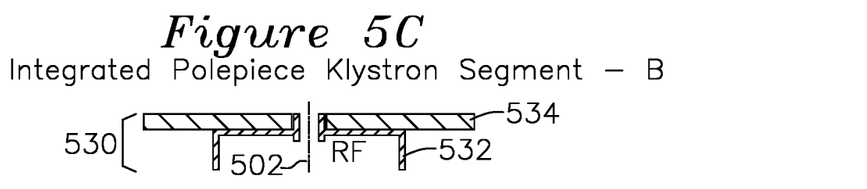

FIG. 5B shows a first construction segment 530 which includes a klystron segment 532, which includes a beam tunnel segment 533 formed from layers of fused copper particles to level 531 as before. The beam tunnel segment 533 is used to center and support the iron pole piece 534. The pole piece 534 is installed after removing unfused copper particles below level 531, after which the copper particles are returned, and monolithic structure 536 is formed in layers of copper particles forming segment 530A up to level 537, as shown in FIG. 5D.

Because pole pieces of the prior art are installed in halves around a finished electron tube structure, this approach of installing the pole pieces later as halves would also require scaffolding structure (typically sacrificial co-axial pedestals in the gap region between surface 535 and level 537 where the pole pieces are positioned) to be formed to support the horizontal layer 535 of fused metal above level 537, where the pedestals (not shown) are removed before installation of the pole pieces 534 such as by machining the gap between 535 and level 537 to remove the sacrificial pedestals before the halves of pole piece 534 are installed.

Figure 5D:
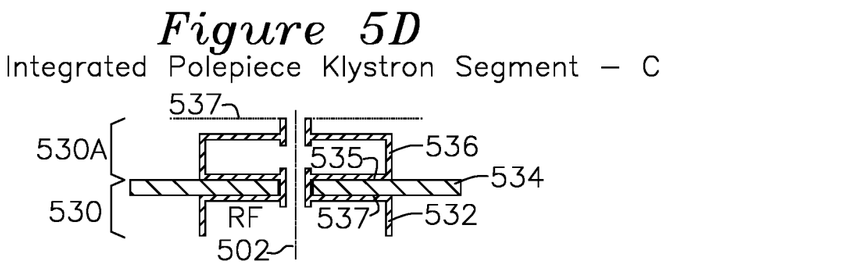

An important advantage of the construction of FIG. 5D over the prior art is that the subsequent deposition layer 535 of FIG. 5D may be formed directly onto the surface of the pole piece 534, which acts as a magnetic circuit element and also a functional scaffold to support the deposition layer 535 in contact with pole piece 534. Another aspect of the invention is that the outer diameter of the cooling cavities can be arbitrary compared to the underlaying resonant cavity, and more generally, each cooling cavity, resonant RF cavity, drift tube, and other structures positioned on top of a pole piece may have any diameter as required, since the pole piece below is also acting as a support scaffold for any fused powdered metal structure above it.

Figure 5E:
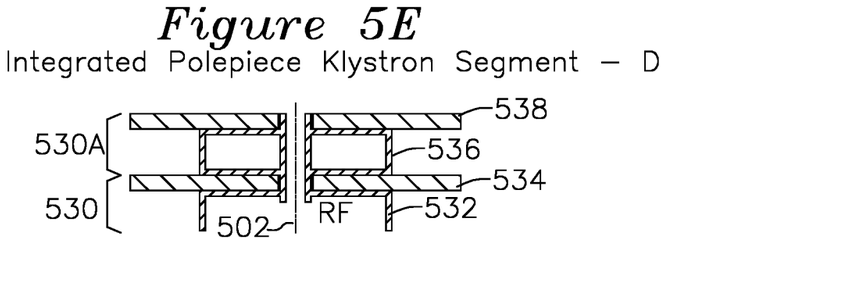
Figure 5F:
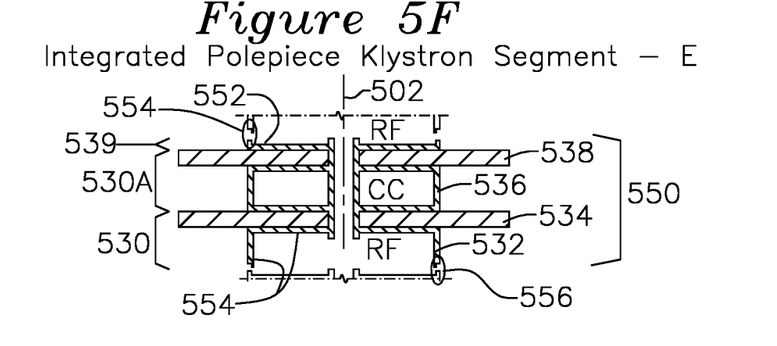

FIG. 5E shows the unfused copper particles partially removed below the level 537 of fused particles to install integrated pole piece 538. FIG. 5F shows the copper particles returned, forming the final segment 539. The extent 550 shows the klystron segment including RF circuit segments with embedded iron pole pieces 538 and 534, where the RF cavities on each exposed surface 552 and 554 can now be machined for a desired surface finish, and interlocking surfaces 552 and 556 provided to fixture the segments to each other for subsequent brazing. An advantage of the process of fusing copper on top of the iron pole piece is improved thermal conductivity from the iron pole piece and the copper structure, which includes the cooling cavities.

Figure 6:
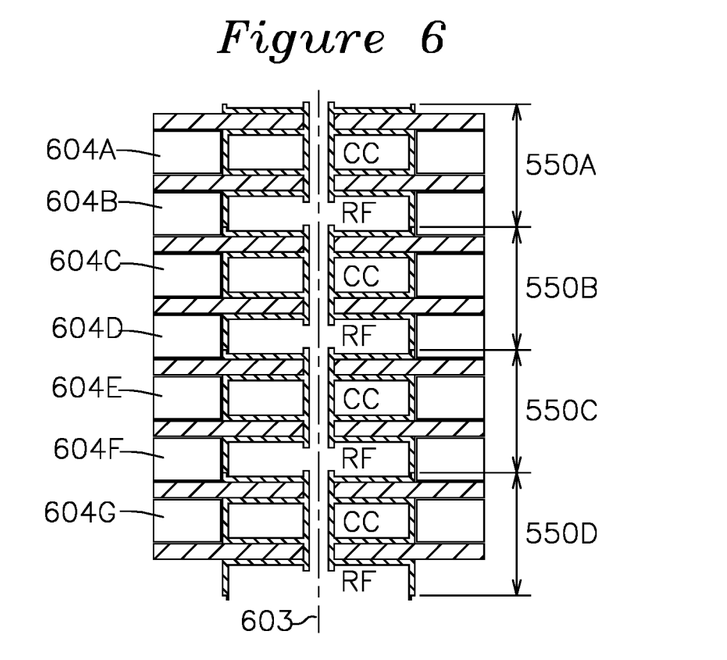
FIG. 6 shows a cross section view of a klystron formed from modular segments and permanent magnets brazed into a final assembly.

FIG. 6 shows a completed klystron, which is formed from segments 550A, 550B, 550C, 550D, which are brazed together using the assemblies 550 of FIG. 5F. In one example of the invention, each additional segment is sequentially brazed using a succession of lower temperature braze metals to reduce the likelihood of warpage of the assembled unit (with lowest temperature braze metal at the bottom of the stack) during the high temperature bakeout operation which follows the final segment braze operation. Following the high temperature brazing (and baking) operations, magnetic field generators 604A, 604B, 604C, 604D, 604E, 604F, and 604G are subsequently added to complete the magnetic circuit, either as a series of discrete disc magnets positioned a radial separation distance from the central axis 603, or as coils energized with a DC source of current, or in any manner known in the art of klystron magnetic field generators.

Figure 7:
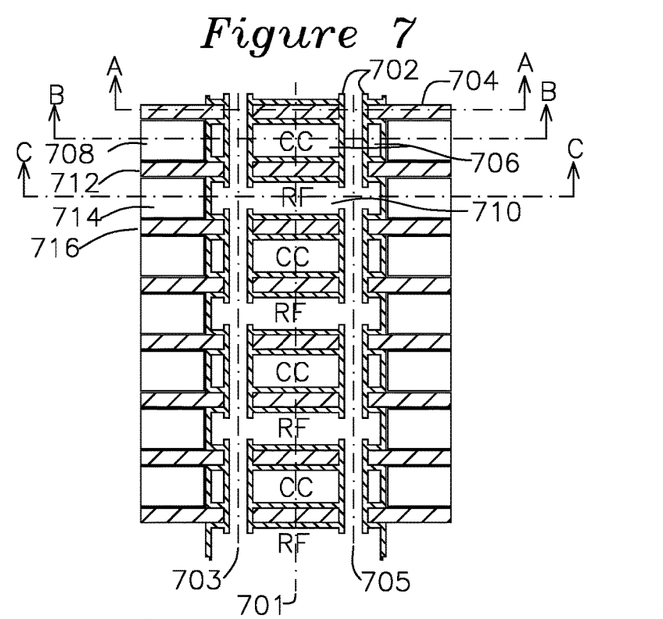
FIG. 7 is a section view of the RF circuit for an example multiple beam device.
Figures 7A, 7B, 7C:
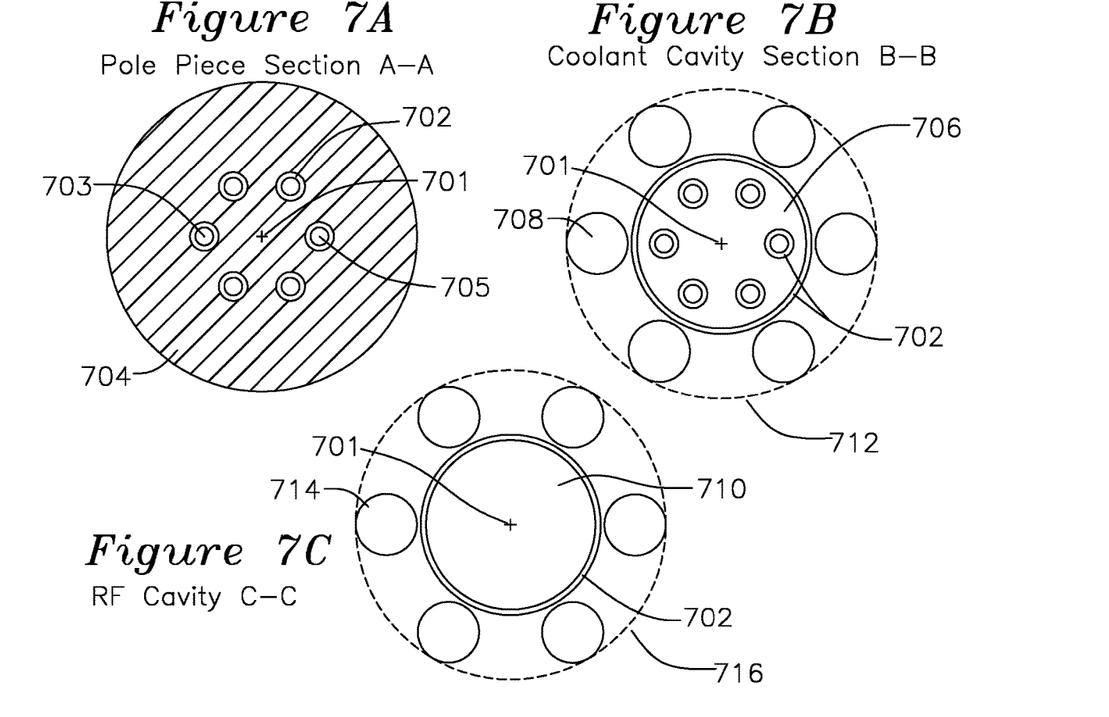
FIGS. 7A, 7B, and 7C show various cross section views of the RF circuit of FIG. 7.

FIG. 7 shows a multi-beam version of the klystron, which may be fabricated in sections, as was described for the assembly of FIG. 5F, inner surfaces machined, and assembled into a complete assembly as described in FIG. 6, where the sections of FIG. 5F provide access to machine inner surfaces of the RF cavities and beam tunnel such as with rotating cutting tools, or the electron device may be fabricated as a single monolithic device, with the copper particles fused using 3D printing techniques to form the monolithic structure 536, and the various pole pieces added during fabrication at each point where a flange may be used to fixture the pole piece 534 or 538 about the pole piece aperture, since the pole pieces will be captured by monolithic structure 543. In this type of segmented construction, pole pieces such as 712 and 716 may be sequentially placed on the flanges of the monolithic structure 702 (or segments as was described in FIG. 5F) as it is formed, later followed by associated pole piece 708 and 712 magnetic field generators after high temperature processing operations are completed. FIG. 7A shows a section view A-A of FIG. 7, including pole piece 704 about central axis 701 with individual beam tunnels 703 and 705 positioned a substantially uniform separation distance from central axis 701 and having substantially uniform included angle from each beam tunnel axis (not shown, but centered in each beam tunnel 702). In operation, each beam tunnel supports a separate electron beam, which provides the advantage of increasing the number of velocity modulated electrons in the separate electron beams, which would otherwise be difficult to support in a single electron beam because of space charge repulsion within a single electron beam with associated higher electron density. FIG. 7B shows section B-B of FIG. 7 showing a coolant cavity 706 for the circulation of a liquid coolant, contained by monolithic structure 702, as well as optional magnetic field generators 708 mounted on pole piece 712 (not in section view but shown for reference). The coolant cavity section 7B typically includes the magnetic field generators and also drift tubes, which are beam tunnel segments which are at the potential of the monolithic structure, as best seen in FIG. 7. The gaps between drift tube segments form the RF cavities 710, shown in section C-C of FIG. 7 as FIG. 7C, with the RF cavity 710 enclosed by monolithic structure 702. Magnetic field generators 714 are shown for reference, supported by pole piece 716 (for reference as it is below section C-C of FIG. 7).

An advantage of forming a single monolithic structure in a sequence of segments and iteratively placing pole pieces on each successive completed segment, and then continuing to add layers of particles and fusing them to form the next segment in the iterative fashion of the invention is that the pole pieces and magnetic field generators may be placed and embedded into the monolithic structure as complete units, such that the multi-beam structure of FIG. 7 is possible, whereas such structures are not possible to fabricate using any available prior art subtractive method. Alternatively, the multi-beam device of FIG. 7 may be formed in segments and with RF cavities and beam tunnel surfaces machined (as was shown in FIGS. 5F and 6), and the segments brazed together to form the completed electron beam device.

Many variations of the present invention are possible, the method for forming the klystron in two halves of FIG. 3A or the method of forming the klystron about a central axis of FIGS. 4A, 5A and 6 are examples of construction methods according to the present invention. Further, the fabrication method is not restricted to only klystron devices. Electron devices such as magnetrons, cross field amplifiers, and inductive output tube devices may also be advantageously fabricated using the present invention, and the use of different metal particle sizes or layer thickness may be used to create RF cavities with desired Q-factor characteristics for each type. Additionally, multiple electron beam tunnel devices may be constructed using the present method. Examples of multiple beam klystrons may be found in U.S. Pat. Nos. 6,768,265, and 6,847,168 assigned to present applicant Calabazas Creek Research. Additionally, any electron beam RF circuit may be formed using the present invention, including a Traveling Wave Tube (TWT) or other such linear electron beam device.

Material dimensions may vary according to frequency, power, or particular device type or application. Where dimensions are provided as examples, approximately is understood to mean the dimension may typically be 3× larger or ⅓ of the nominal dimension. "On the order of" is understood to mean 10× larger or ⅟₁₀ of nominal dimension. A grain or particle size is understood to be a mean of the longest dimension of the particles in a distribution of particle sizes. Particle sizes are understood to be limited only by the size of particle which may be fused to other particles and maintain any desired property such as vacuum holding capability or surface roughness in the finished device. "Substantially" is understood to provide a variation of the associated parameter which results in less than 2× or ½ change in dimension, bandwidth, angle, power, or other factor, specific to the parameter referenced as "substantially".

We claim:

1. A method for forming an RF circuit segment on one or more underlaying layers of metal powder, the method operative with an electron beam having sufficiently high power density to fuse the metal powder, the method comprising:
   iteratively performing the steps of:
   applying a thin layer of metal powder above an underlying layer;
   fusing the metal powder in a pattern using the electron beam, the pattern including at least one beam tunnel and at least one Radio Frequency (RF) cavity, the RF cavity and beam tunnel having exposed internal surfaces for finishing with a rotating tool;
   removing unfused metal powder;
   providing at least one surface of the RF circuit segment with a lip or edge for interlocking to an adjacent RF circuit segment;
   smoothing internal surfaces of the RF cavity for a desired Q-factor.

2. The method of claim 1 where said thin layer of metal powder has a grain size on the order of either 10 um or 100 um.

3. The method of claim 1 where said metal powder is powdered copper.

4. The method of claim 1 where said metal powder has a grain size in the range of 50 um to 100 um.

5. The method of claim 1 where said thin layer of metal powder is thinner in regions where the pattern for a current layer has a greater planar displacement compared to a region where the pattern for a current layer has a small planar displacement.

6. The method of claim 1 where said at least one beam tunnel has an axis which is substantially parallel to an axis of the RF circuit segment.

7. The method of claim 1 where said lip or edge has braze joints on a plane which is substantially normal to the central axis of the RF circuit.

8. The method of claim 1 where said fused powder has sufficient density to maintain a vacuum seal sufficient for the RF circuit segment to operate as at least one of: a klystron, a magnetron, a cross field amplifier, and an inductive output tube.

9. The method of claim 1 where the fused metal particles capture at least one pole piece surrounding the at least one beam tunnel.

10. The method of claim 1 where the RF circuit segment includes a cooling cavity having a fluidic inlet and a fluidic outlet.

11. The method of claim 9 where the at least one beam tunnel comprises a plurality of beam tunnels arranged a uniform separation distance from a central axis of the RF circuit segment.

12. The method of claim 1 where the plurality of beam tunnels have a substantially uniform internal angle with respect to the central axis.

13. A method for forming an RF circuit segment from fused metal powder, the RF circuit having a central axis, the method comprising:
- applying a plurality of thin layers of metal powder above a removable substrate;
- fusing each of the thin layers of metal powder in a pattern using an electron beam, the pattern including at least one beam tunnel and at least one Radio Frequency (RF) cavity, the RF cavity and the at least one beam tunnel having exposed internal surfaces for finishing with a rotating tool;
- removing unfused metal powder after fusing each of the thin layers of metal powder;
- the fused metal powder capturing a pole piece in the fused metal powder, the pole piece having apertures corresponding to the locations of the at least one beam tunnel;
- providing at least one surface of the RF circuit segment with a lip or edge for interlocking to an adjacent RF circuit segment to form an RF cavity;
- smoothing internal surfaces of the RF cavity for a desired Q-factor.

14. The method of claim 13 where the RF circuit segment includes a cooling cavity having a fluidic inlet and a fluidic outlet.

15. The method of claim 13 where the RF cavity includes a coaxial cooling cavity sharing at least one wall with the RF cavity, the coaxial cooling cavity having a fluidic inlet and a fluidic outlet.

16. The method of claim 13 where said metal powder is copper.

17. The method of claim 13 where said metal powder has a grain size in the range of 10 um to 100 um.

18. The method of claim 13 where a thin layer of metal powder is thinner in regions where the pattern for a current layer has a greater planar displacement compared to a region where the pattern for the current layer has a small planar displacement.

19. The method of claim 13 where the at least one beam tunnel is a plurality of beam tunnels, each beam tunnel located a uniform distance from the central axis.

20. The method of claim 13 where the lip or edge has braze joints on a plane which is substantially normal to the central axis.

21. A method for forming an RF circuit segment having a central axis from fused metal powder, the method comprising:
- applying a plurality of thin layers of metal powder above a substrate;
- fusing each of the thin layers of metal powder in a pattern using an electron beam, the pattern including at least one beam tunnel and at least one Radio Frequency (RF) cavity, the RF cavity and each beam tunnel having exposed internal surfaces for finishing with a rotating tool;
- removing unfused metal powder after fusing each of the thin layers of metal powder;
- providing at least one surface of the RF circuit segment with a lip or edge for interlocking to an adjacent RF circuit segment to form an RF cavity;
- arranging at least one pole piece between a fused layer and a thin layer of metal powder such that the pole piece is captured between fused layers of metal powder, the pole piece having an aperture in each location corresponding to a beam tunnel;
- smoothing internal surfaces of the RF cavity for a desired Q-factor.

22. The method of claim 21 where the pattern of the RF circuit segment includes a cooling cavity having at least one common wall with the RF cavity, the cooling cavity having an inlet and an outlet.

23. The method of claim 21 where the at least one beam tunnel comprises a plurality of beam tunnels arranged about the central axis.

24. The method of claim 21 where an included angle between each beam tunnel and the central axis is substantially uniform.

25. The method of claim 21 where the metal powder is powdered copper.

26. The method of claim 21 where the RF circuit segment has a beam tunnel axis which is substantially parallel to the electron beam axis.

27. The method of claim 21 where the lip or edge has braze joints on a plane which is substantially normal to the central axis of the RF circuit segment.

* * * * *

UNITED STATES PATENT AND TRADEMARK OFFICE
CERTIFICATE OF CORRECTION

| | |
|---|---|
| PATENT NO. | : 11,072,024 B1 |
| APPLICATION NO. | : 16/411139 |
| DATED | : July 27, 2021 |
| INVENTOR(S) | : R. Lawrence Ives et al. |

It is certified that error appears in the above-identified patent and that said Letters Patent is hereby corrected as shown below:

In the Specification

Please insert the following paragraph after Column 1, Line 4:
--This invention was made with government support under DE-SC0017788 awarded by the U.S. Department of Energy. The government has certain rights in this invention.--

Signed and Sealed this
Fourth Day of June, 2024

Katherine Kelly Vidal
*Director of the United States Patent and Trademark Office*